(12) United States Patent
Krulik et al.

(10) Patent No.: US 12,263,698 B2
(45) Date of Patent: Apr. 1, 2025

(54) SHOCK ABSORBING LUGGAGE WHEEL

(71) Applicant: Briggs and Riley Travelware, LLC, Hauppauge, NY (US)

(72) Inventors: Richard Krulik, Northport, NY (US); Georgene Rada, Northport, NY (US); Alan Sticca, White Plains, NY (US); Daehwan Kim, Bayside, NY (US); Florian Witt, Wentorf (DE); Matthias Hecker, Hamburg (DE)

(73) Assignee: BRIGGS & RILEY TRAVELWARE LLC, Hauppauge, NY (US)

( * ) Notice: Subject to any disclaimer, the term of this patent is extended or adjusted under 35 U.S.C. 154(b) by 107 days.

(21) Appl. No.: 17/889,063

(22) Filed: Aug. 16, 2022

(65) Prior Publication Data
US 2023/0057570 A1 Feb. 23, 2023

Related U.S. Application Data

(60) Provisional application No. 63/234,021, filed on Aug. 17, 2021.

(51) Int. Cl.
*A45C 5/14* (2006.01)
*B60B 33/00* (2006.01)
*F16F 15/04* (2006.01)

(52) U.S. Cl.
CPC .......... *B60B 33/0028* (2013.01); *A45C 5/14* (2013.01); *F16F 15/04* (2013.01)

(58) Field of Classification Search
CPC ........ B60B 33/0028; A45C 5/14; F16F 15/04
See application file for complete search history.

(56) References Cited

U.S. PATENT DOCUMENTS

| | | | | |
|---|---|---|---|---|
| 4,762,739 | A * | 8/1988 | Kraus | B60B 33/0063 |
| | | | | 428/35.8 |
| 6,076,641 | A * | 6/2000 | Kinzer | B60B 33/0002 |
| | | | | 220/531 |
| 7,523,773 | B2 * | 4/2009 | Gabrys | B60B 9/26 |
| | | | | 152/80 |

(Continued)

FOREIGN PATENT DOCUMENTS

| CN | 204453628 U | 7/2015 |
|---|---|---|
| WO | 2007149579 A2 | 12/2007 |

OTHER PUBLICATIONS

International Search Report dated Nov. 18, 2022, received in a corresponding foreign application, 3 pages.

*Primary Examiner* — Jason W San
*Assistant Examiner* — Matthew J Sullivan
(74) *Attorney, Agent, or Firm* — Scully, Scott, Murphy & Presser, P.C.

(57) ABSTRACT

A shock absorbing component for a luggage wheel is disclosed. In one practice, the component comprises a resilient circular member comprising an outer circumference; a center hole comprising an incompressible sleeve inserted into the center hole and configured to receive a wheel axle; and a plurality of openings radially disposed between the outer circumference and the center hole, the plurality of openings configured to resiliently deform to absorb shock when the circular member is subjected to force along its longitudinal axis. A wheel assembly for an article of luggage and an article of luggage comprising the shock absorbing component are also separately disclosed.

25 Claims, 6 Drawing Sheets

(56) References Cited

U.S. PATENT DOCUMENTS

| | | | |
|---|---|---|---|
| 9,060,578 B2* | 6/2015 | Meersschaert | B60B 33/00 |
| 9,162,527 B1* | 10/2015 | Harrelson | B60B 33/0028 |
| 9,550,393 B2* | 1/2017 | Abe | B60C 7/24 |
| 9,718,308 B1* | 8/2017 | Chang | B60B 5/02 |
| 9,937,409 B2* | 4/2018 | Seo | A63C 17/22 |
| 10,059,388 B2* | 8/2018 | Rudakevych | B60B 5/02 |
| 10,390,669 B2* | 8/2019 | Kim | B60B 33/00 |
| 10,596,852 B2* | 3/2020 | Brantley | B60B 33/0023 |
| 10,703,140 B2* | 7/2020 | Schaedler | B60C 11/0311 |
| 10,850,207 B2* | 12/2020 | Tilley | A63B 59/30 |
| 11,090,974 B2* | 8/2021 | Christenbutry | B60C 7/16 |
| 11,179,969 B2* | 11/2021 | Thompson | B60C 11/0311 |
| 11,186,121 B2* | 11/2021 | Liu | B60B 5/02 |
| 11,458,771 B2* | 10/2022 | Thorne | B60C 7/14 |
| 11,602,956 B1* | 3/2023 | Koby | A61H 1/00 |
| 11,648,801 B2* | 5/2023 | Christenbury | B60B 9/04 152/12 |
| 11,794,520 B2* | 10/2023 | Su | B60C 19/082 |
| 2005/0077778 A1* | 4/2005 | Lin | B60B 37/10 301/125 |
| 2009/0058175 A1* | 3/2009 | Lin | A63C 17/223 301/5.309 |
| 2009/0243371 A1* | 10/2009 | Karlsson | B60B 9/26 301/35.59 |
| 2012/0233809 A1* | 9/2012 | Lee | B60B 33/0039 16/45 |
| 2014/0083581 A1* | 3/2014 | Schaedler | B60B 9/02 152/5 |
| 2015/0352899 A1* | 12/2015 | Morin | B60B 3/001 16/45 |
| 2016/0096400 A1* | 4/2016 | Nomura | B60B 9/04 152/69 |
| 2017/0008342 A1* | 1/2017 | Martin | B60C 7/22 |
| 2018/0001699 A1* | 1/2018 | Shoji | B60C 7/18 |
| 2020/0276861 A1* | 9/2020 | Thompson | B60B 9/26 |
| 2021/0039431 A1* | 2/2021 | Long | B60C 7/14 |
| 2021/0221170 A1* | 7/2021 | Solheim | B60B 9/04 |
| 2021/0237511 A1* | 8/2021 | Kujawski | B60B 9/26 |
| 2021/0331517 A1* | 10/2021 | Barton | B60B 9/26 |
| 2022/0041010 A1* | 2/2022 | Tang | B60B 25/002 |
| 2022/0053898 A1* | 2/2022 | Shoenhair | A45C 5/03 |
| 2022/0227173 A1* | 7/2022 | Kim | B60C 7/107 |
| 2023/0057570 A1* | 2/2023 | Krulik | F16F 1/3835 |
| 2023/0293971 A1* | 9/2023 | Li | A63C 17/014 280/87.042 |

* cited by examiner

SHOCK ABSORBING LUGGAGE WHEEL

This application claims benefit of priority to U.S. Provisional Patent Application Ser. No. 63/234,021, filed Aug. 17, 2021, the entire contents of which are incorporated herein by reference.

FIELD

The disclosure relates to a shock absorbing component for a luggage wheel, a wheel assembly for an article of luggage comprising the shock absorbing component, and an article of luggage comprising the shock absorbing wheel assembly.

BACKGROUND

Wheeled luggage can cause damaging shocks to packed items, especially electronic and other delicate equipment, when rolled over uneven surfaces. Various attempts to ameliorate the shock using coil springs have been attempted. However, there still exists a need for a simple design of economic advantage that can easily be implemented and reliably absorb pertaining shocks sufficient to protect the contents of the luggage.

SUMMARY

In one embodiment, the disclosure is to a shock absorber component for a luggage wheel, the shock absorber component comprising a resilient circular member comprising: an outer circumference; a center hole; and a plurality of openings radially disposed between the outer circumference and the center hole, the plurality of openings configured to resiliently deform to absorb shock when the circular member is subjected to force along its longitudinal axis. In one instance, the component comprises an incompressible sleeve that is inserted into the center hole and configured to receive a wheel axle. The force along the longitudinal axis of the circular member can be in the direction from the center hole toward the outer circumference, or in the direction from the outer circumference to the center hole, or both.

In another embodiment, the disclosure is to a wheel assembly for an article of luggage, the wheel assembly comprising a stem member configured for mounting to an article of luggage; a first wheel and a second wheel each rotatably attached to opposite sides of the stem member; a first shock absorber component interposed between the first wheel and the stem member, and a second shock absorber interposed between the second wheel and the stem member, the first and second shock absorbers each individually comprising: a resilient circular member comprising: an outer circumference; a center hole comprising an incompressible sleeve and a luggage wheel axle disposed within the incompressible sleeve; and a plurality of openings radially disposed between the outer circumference and the center hole, the plurality of openings configured to resiliently deform and absorb shock when the circular member is subjected to force along its longitudinal axis.

In another embodiment, the disclosure is to an article of luggage comprising a bottom wall, a top wall, opposed first and second side walls, and opposed front and back walls that define a cavity for storage space; a plurality of wheel assemblies attached to the bottom wall, at least one wheel assembly comprising: a stem member mounted to a respective wheel housing, a first wheel and a second wheel each rotatably attached to opposite sides of the stem member; a first shock absorber component interposed between the first wheel and the stem member, and a second shock absorber interposed between the second wheel and the stem member, the first and second shock absorbers each individually comprising: a resilient circular member comprising: an outer circumference; a center hole comprising an incompressible sleeve, and a luggage wheel axle disposed within the incompressible sleeve; and a plurality of openings radially disposed between the outer circumference and the center hole, the plurality of openings configured to resiliently deform and absorb shock when the circular member is subjected to force along its longitudinal axis.

DETAILED DESCRIPTION

The ensuing detailed description and reference to the figures is exemplary only and not restrictive of the scope of the disclosure.

Figure 1A:
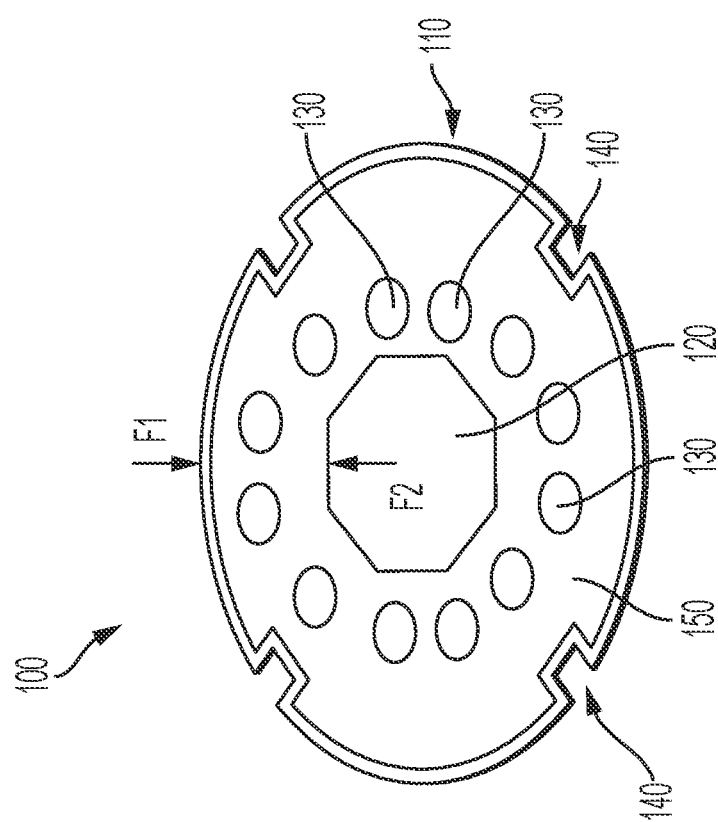
FIG. 1A is a plan view of an embodiment of a shock absorber component of the disclosure.
Figure 1B:
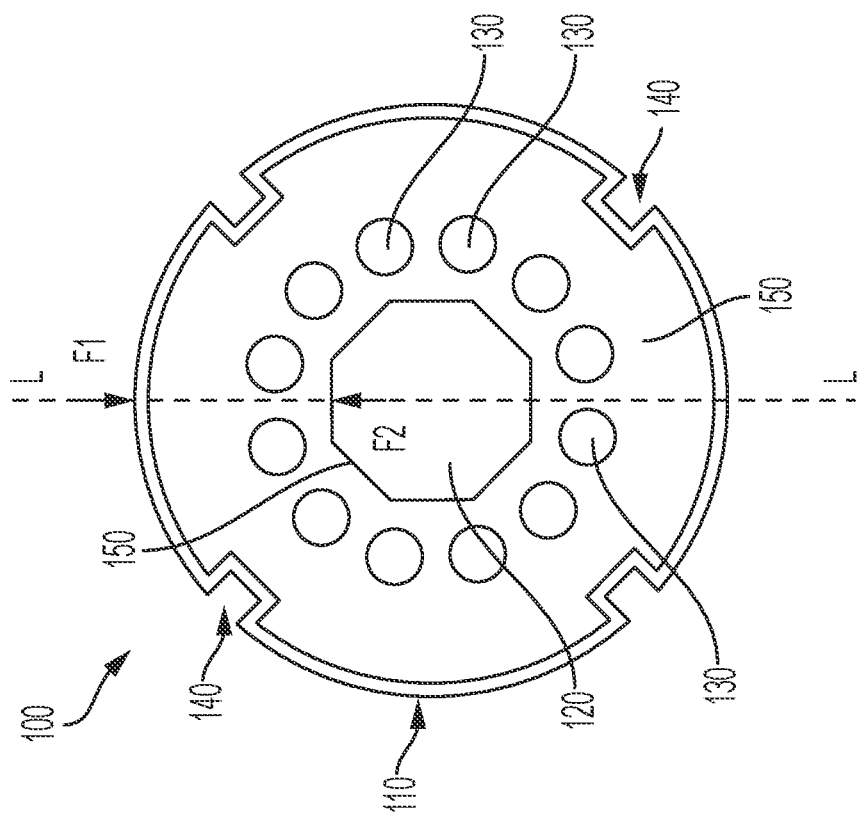
FIG. 1B is a plan view of the shock absorber component of FIG. 1A when subjected to force along its longitudinal axis.
Figure 3:
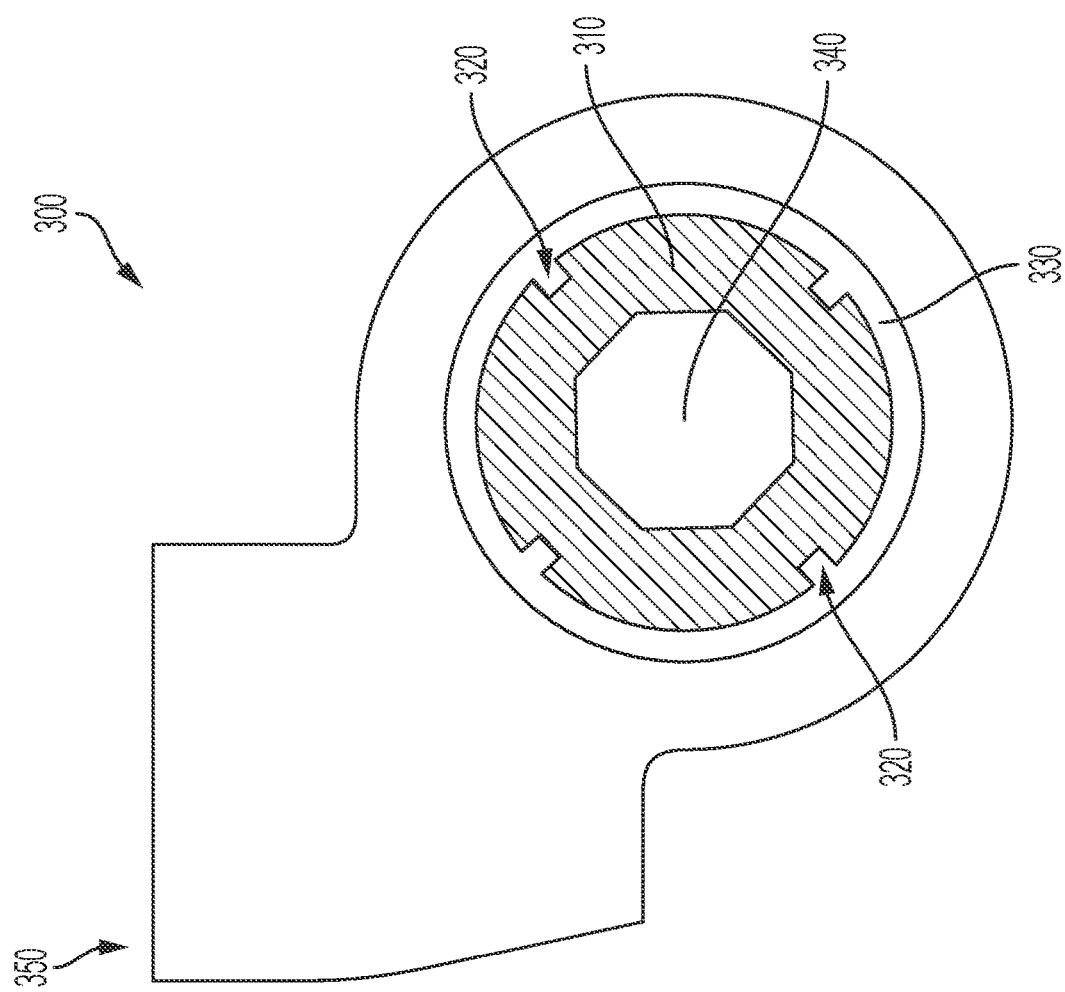
FIG. 3 is a plan view of an embodiment of a stem member component for a wheel assembly of the disclosure.
Figure 4:
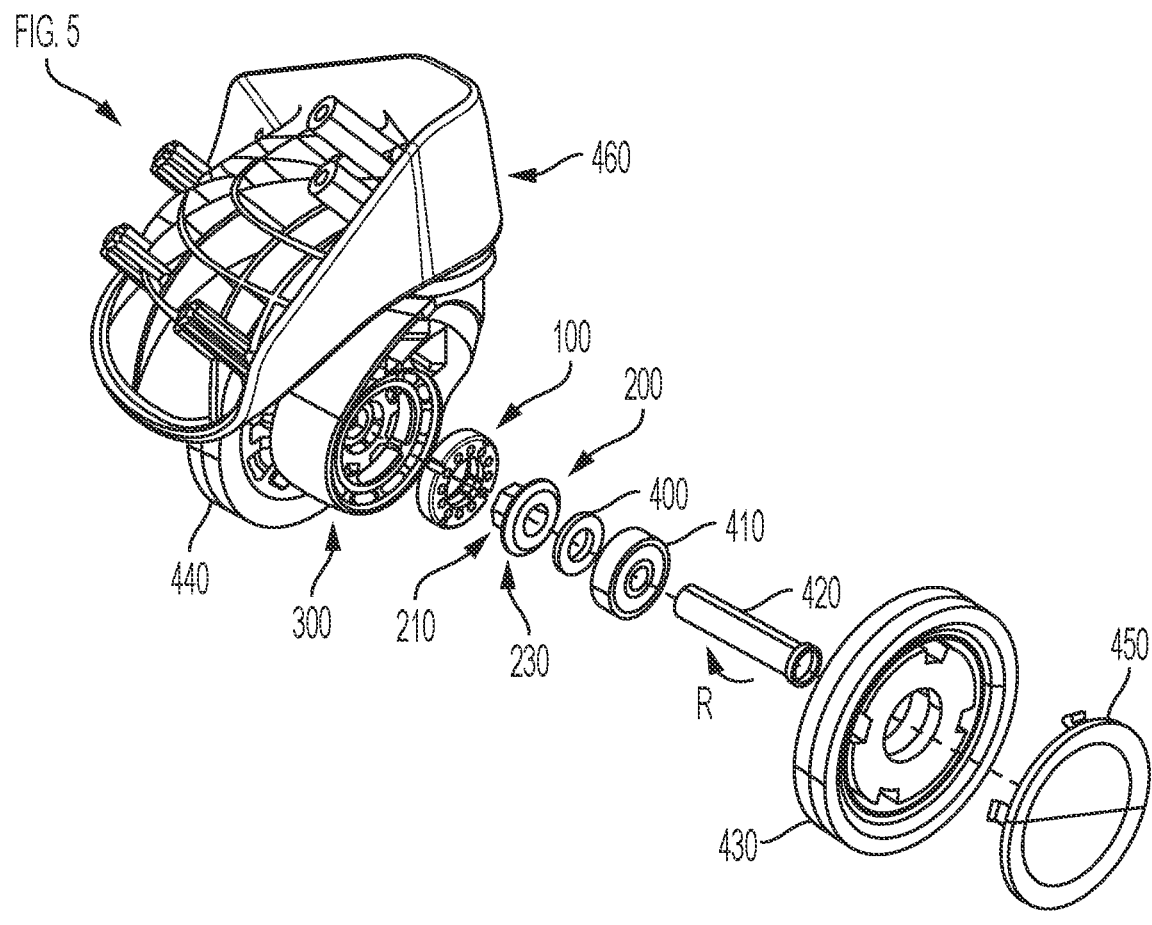
FIG. 4 is an exploded view of a wheel assembly of FIG. 3 comprising a shock absorber component of the disclosure.

Referring to FIG. 1A, thereat is a plan view of an exemplary shock absorber component 100 for use with luggage comprising a resilient circular member 150, in the form of a disc, which has longitudinal axis "L" which is the axis perpendicular to the axis of rotation of member 150 (see R in FIG. 4, which is the axis of rotation of wheel axle 420 to which axis of rotation L is perpendicular). The term 'resilient' as used herein refers to behavior where a material of construction can be deformed when force is applied (FIG. 1B) and return to their original shape when the force applied is absent (FIG. 1A). Representative materials of construction in this regard comprise polymeric materials such as rubber, elastomers, including thermoplastic elastomer (TPE) and including the classes of TPE comprising styrenic block copolymers, thermoplastic polyolefinelastomers, thermoplastic vulcanizales, thermoplastic polyurethanes, thermoplastic copolyesters, thermoplastic polyamides, and combinations of any of the foregoing. Circular member 150 comprises an outer circumference 110 and a center hole 120 which can be any shape, including as depicted a polygonal shape, such as the octagonal shape shown. Circular member 150 also comprises a plurality of openings 130 that are radially disposed between the outer circumference 110 and the center hole 120, e.g. openings 130 can be disposed parallel to the outer circumference 110. The plurality of openings 130 can be of any shape and can be of the same or different shapes and/or be the same or different sizes. In the non-limiting practice depicted, the plurality of openings 130 are circular and of the same size. The number of openings 130 can vary, e.g. two or more openings can be employed; in the practice shown, twelve openings 130 are representatively employed. The plurality of openings 130 are configured to resiliently deform as shown in FIG. 1B to absorb shock when the circular member is subjected to force along its longitudinal axis, L. Such forces can be when the outer circumference 110 is compressed toward center hole 120 (i.e. in the direction of arrow F1 along axis L) and/or when center hole 120 is compressed toward the outer circumference 110 (i.e. in the direction of arrow F2 along axis L) as, for example, would occur when a wheel axle disposed through center hole 120 jostles up and down as the article of luggage is rolled over an uneven surface. In one practice, the outer circumference 110 comprises one or more notches 140 which are configured to mate with a complementary projection element 320 in a stem member 300 for a wheel assembly (as shown in FIG. 3) to secure the circular member 150 to the stem member 300. Alternatively, the outer circumference 110 can comprise one or more projection elements (not shown) or a combination of projection elements and notches which are configured to mate with a complementary notches (not shown) or a complementary combination of notches and projection elements in a stem member 300 for a wheel assembly (as shown in FIG. 3) to secure the circular member 150 to the stem member 300.

Figure 2B:
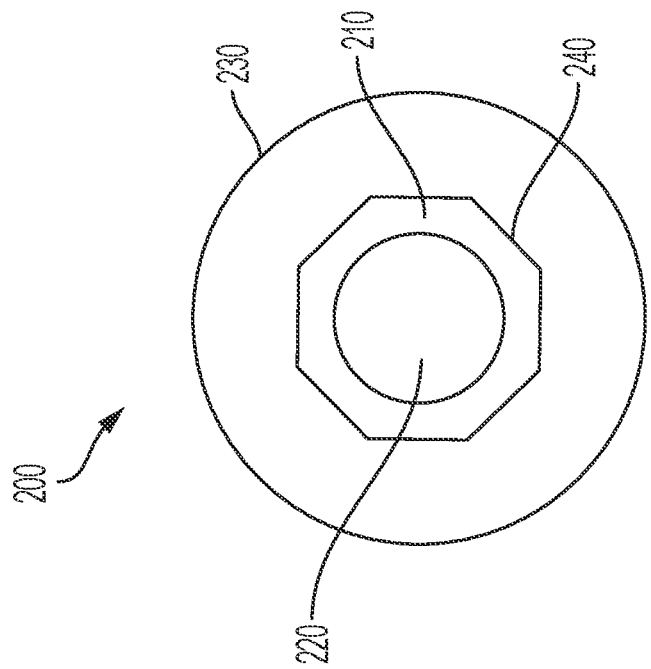
FIG. 2B is a plan view of the flanged bushing plug of FIG. 2A.
Figure 2A:
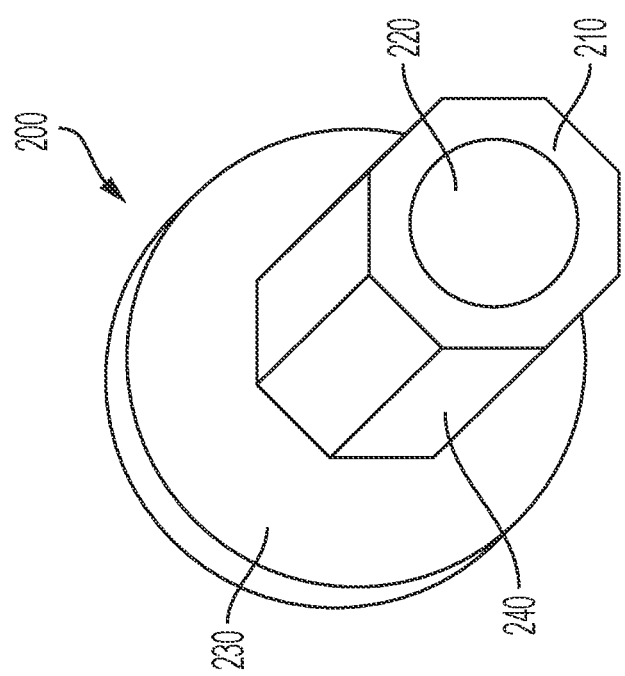
FIG. 2A is a perspective view of an embodiment of an incompressible sleeve of the disclosure comprising an optional flange, the assembly in the form of a flanged bushing plug.

In one practice, the shock absorber component further comprises an incompressible sleeve that is inserted into the center hole. The incompressible sleeve comprises a material of construction and/or is of a design that resists deformation when forces F1 and/or F2 are applied. Without limitation, serviceable materials of construction for the incompressible sleeve comprise metal, hard polymers such as comprised of acrylic, polyamide, polyamide nylon, reinforced polyamide nylon, e.g. polyamide nylon with 15% glass fiber reinforced, medium viscous polybutylene terephthalate. The incompressible sleeve has a hole therethrough configured to receive an axle for a luggage wheel. Referring to FIGS. 2A and 2B, thereat is an embodiment of an incompressible sleeve 210 having hole 220 configured to receive a luggage wheel axle, and which, in the embodiment depicted, also comprises an optional flange 230 at one end, e.g. such a configuration shown as flange bushing plug 200 shown in FIG. 2. In one instance, flange 230 is of a size sufficient to cover and thereby protect the plurality of openings 130 on the respective side of the circular member 110 when incompressible sleeve 210 is inserted into center hole 120. In one practice, the outer surface 240 of incompressible sleeve 210 and the shape of the center hole 120 in the circular member are configured complementary to each other so that the incompressible sleeve 210 securely fits into the center hole 120. For example, center hole 120 can comprises a polygonal shape, and the outer surface of the incompressible sleeve can comprise a polygonal shape complementary to that of the center hole. In the non-limiting embodiment shown in FIGS. 1 and 2, center hole 120 is octagonal having sides 150 and the outer surface 240 of incompressible sleeve 210 is also octagonal and configured to mate with sides 150 to securely fit the sleeve into the center hole.

Referring to FIGS. 3 and 4, thereat are respectively depicted an embodiment of a stem member and a wheel assembly for an article of luggage. Stem member 300 is configured for connection at 350 to an article of luggage by means known in the art, e.g. be connecting to a wheel housing 460 which in turn is mounted to the bottom of an article of luggage (not shown). Stem member comprises an inset area 310 (diagonal lined area in FIG. 3) defined by raised rim area 330 which is configured to receive shock absorbing component 100 as representatively depicted in FIG. 1. In the practice shown, stem member has projection elements 320 which are complementary to the notches 130 in circular member 110 to securely hold the shock absorber member 100 in place. Stem member 300 has an axle hole 340 which in the embodiment shown is octagonal and sized to mate with the octagonal shape of the outside surface 240 of incompressible sleeve 210. The luggage wheel axle is then disposed in hole 220. In the practice shown in FIG. 4, stem member 300 has first and second wheels, 430 and 440, rotatably attached to opposite sides of the stem member 300 by wheel axle 420. Wheel axle 420 passes through first wheel 430, bearings 410, bushing 400. Flange busing plug 200 has its incompressible sleeve 210 inserted into center hole 120 of shock absorber 110 and comprises flange 200 which is sized to cover the plurality of openings 130. Shock absorber component 100 is fitted into inset 310 in stem member 300. Cover 450 can be used on wheel 430. The second wheel 440 is correspondingly attached to the opposite side of stem member 300. The stem member can be of fixed or swivel design. Details of the second wheel 440 and its assembly and attachment are represented in FIG. 5.

Figure 5:
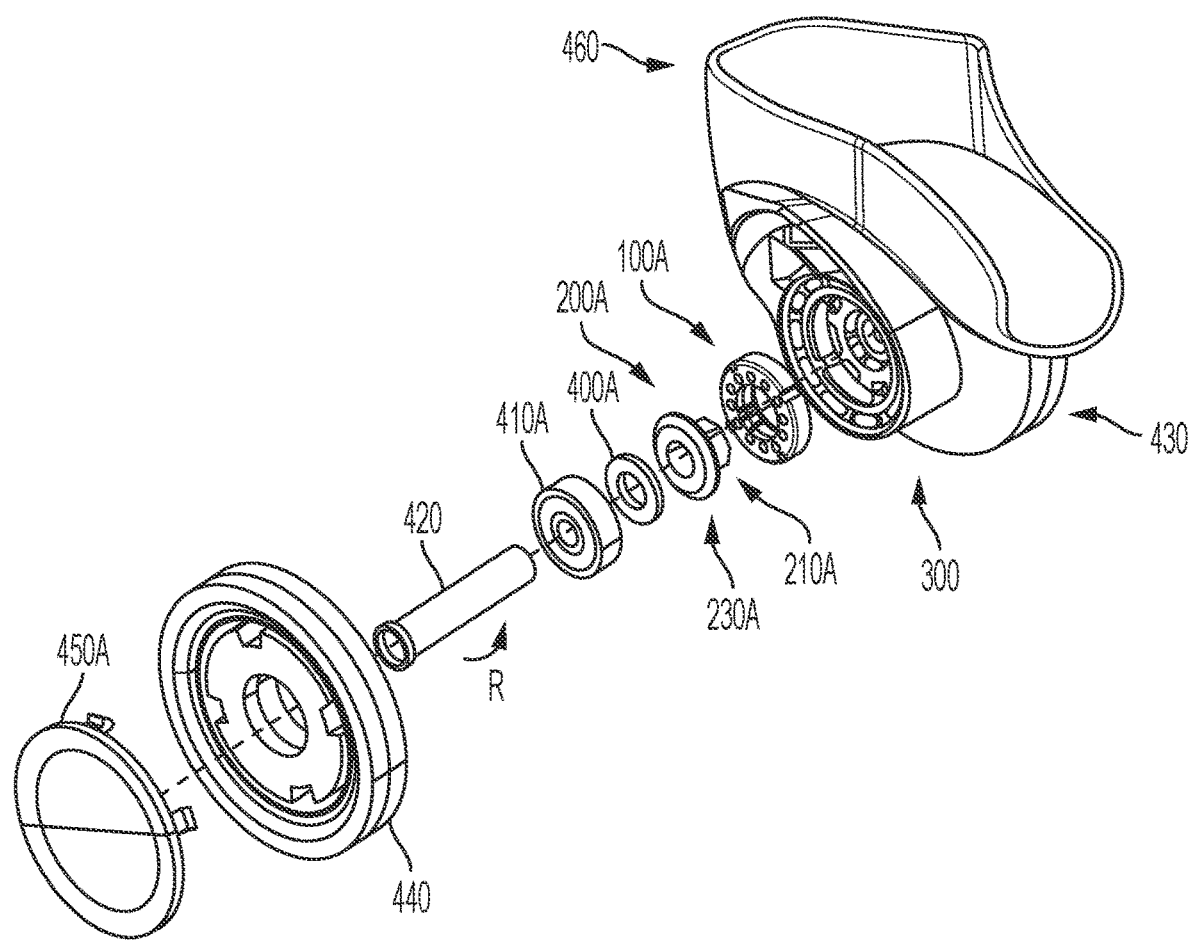
FIG. 5 is an exploded view of the wheel assembly of FIG. 4 as shown from the opposite side as indicated.

Referring to FIG. 5, thereat is an exploded view of the opposing side of the wheel assembly depicted in FIG. 4. Shown at FIG. 5 is second wheel 440 with cover 450A, axle 420 (which can be the same axle 420 as shown in FIG. 4 or a separate axle just for wheel 440), bearings 410A, bushing 400A, flange busing plug 200A with flange 230A, incompressible sleeve 210A, shock absorber 100A, all similarly assembled as for first wheel 430 as shown in FIG. 4.

Figure 6A:
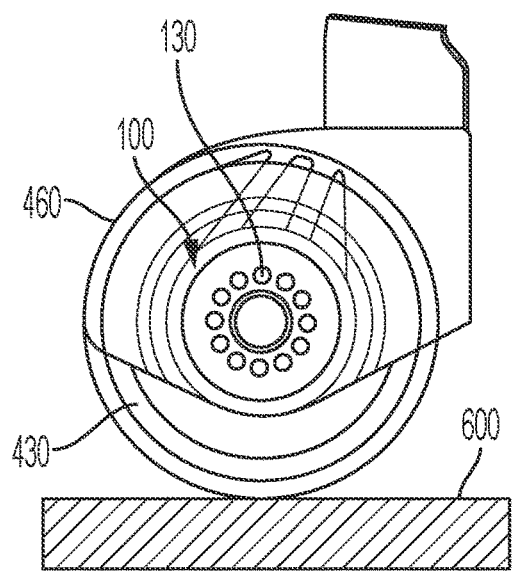
FIGS. 6A and 6B are side views showing am embodiment of a wheel comprising a shock absorber of the disclosure on a flat surface and upon hitting a bump, respectively.
Figure 6B:
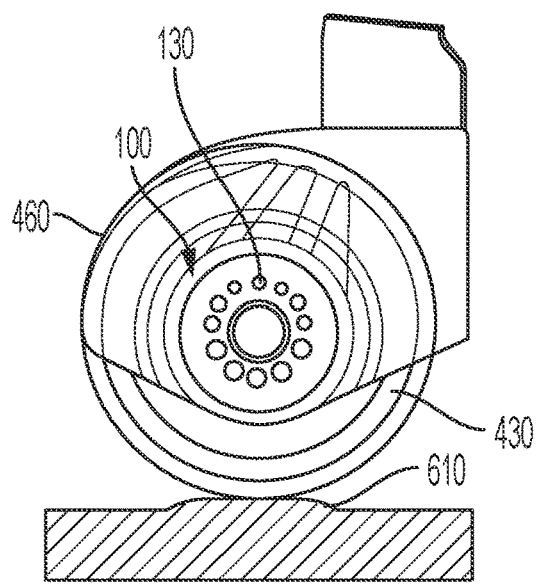
Figure 6C:
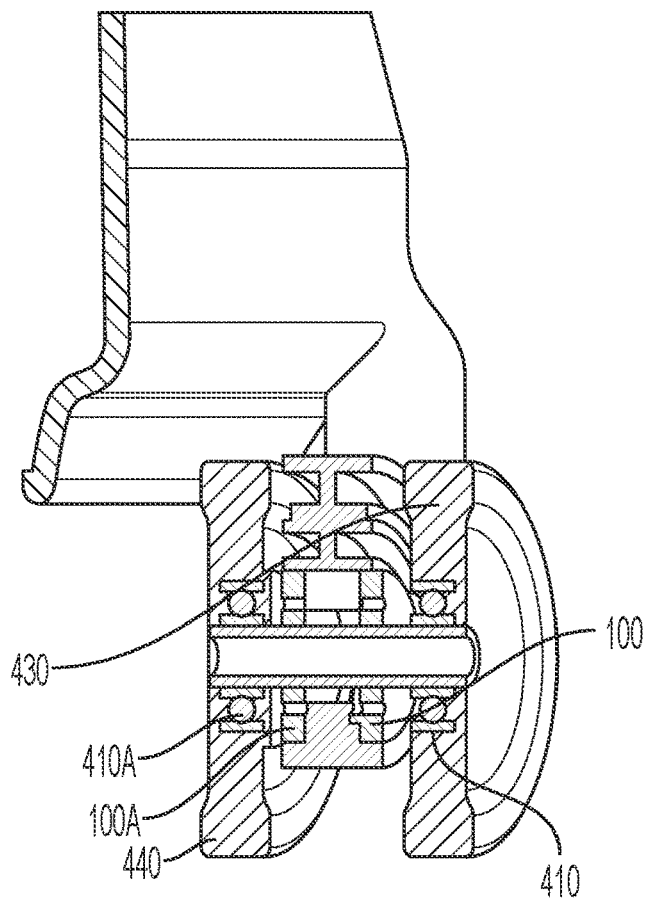
FIG. 6C is a perspective partial cut-away view of an embodiment of a wheel assembly for an article of luggage comprising a shock absorber of the disclosure.

FIG. 6A shows a wheel assembly comprising the shock absorber 100 comprising plurality of openings 130 in wheel housing 460 on a flat surface 600. FIG. 6B shows the wheel assembly of FIG. 6A upon hitting a bump 610 whereupon the plurality of openings 130 resiliently deform as shown to absorb the impact of the shock of hitting the bump. FIG. 6C is a partial depiction of an embodiment of a wheel assembly comprising the shock absorber of the disclosure showing first and second wheels 430, 440 with shock absorbers 100 and 100A respectively, and bearing 410 and 410A respectively.

What is claimed is:

1. A shock absorber component for a luggage wheel for an article of luggage comprising:
   a resilient circular member comprising:
   an outer circumference;
   a center hole configured to receive a luggage wheel axle of the article of luggage; and
   a plurality of openings radially disposed between the outer circumference and the center hole, the plurality of openings configured to resiliently deform to absorb shock when the circular member is subjected to force along its longitudinal axis, wherein the outer circumference of the circular member comprises a notch or projection portion configured to mate with a complementary projection or notch portion in a stem member for a wheel assembly to secure the circular member to the stem member.

2. The component of claim 1 wherein each opening in the plurality of openings is circular.

3. The component of claim 1 further comprising an incompressible sleeve inserted into the center hole and configured to receive the luggage wheel axle.

4. The component of claim 3 wherein the incompressible sleeve comprises a flanged end.

5. The component of claim 4 wherein the outer surface of the incompressible sleeve and the center hole are configured complementary to each other for securely fitting the incompressible sleeve within the center hole.

6. The component of claim 5 wherein the center hole comprises a polygonal shape, and the outer surface of the incompressible sleeve comprises a polygonal shape complementary to that of the center hole.

7. The component of claim 6 wherein the center hole is octagonal, the outer surface of the incompressible sleeve is octagonal, and the plurality of openings comprises up to twelve circular holes.

8. The component of claim 1 wherein the force to which the plurality of openings is configured to resiliently deform so as to absorb shock (i) is along the longitudinal axis is in the direction from the center hole toward the outer circumference, or is (ii) in the direction from the outer circumference to the center hole, or is (iii) both (i) and (ii).

9. The component of claim 1 wherein the circular member is comprised of rubber or a thermoplastic elastomer (TPE).

10. The component of claim 4 wherein the incompressible sleeve is comprised of a reinforced polyamide nylon.

11. A wheel assembly for an article of luggage comprising:
a stem member configured for connection to an article of luggage,
a first wheel and a second wheel each rotatably attached to opposing sides of the stem member;
a first shock absorber component interposed between the first wheel and the stem member, and a second shock absorber interposed between the second wheel and the stem member, each of the first and second shock absorbers individually comprising:
a resilient circular member comprising:
an outer circumference;
a center hole comprising an incompressible sleeve and an axle disposed within the incompressible sleeve; and
a plurality of openings radially disposed between the outer circumference and the center hole, the plurality of openings configured to resiliently deform and absorb shock when the circular member is subjected to force along its longitudinal axis, wherein the outer circumference of the circular member and the stem member each comprise complementary notch and projection portions for securing the circular member to the stem member.

12. The wheel assembly of claim 11 wherein the incompressible sleeve comprises a flanged end.

13. The wheel assembly of claim 11 wherein the force along the longitudinal axis is in the direction from the center hole toward the outer circumference, or in the direction from the outer circumference to the center hole, or both.

14. The wheel assembly of claim 11 wherein the outer surface of the incompressible sleeve and the center hole are configured complementary to each other for securely fitting the incompressible sleeve within the center hole.

15. The component of claim 14 wherein the center hole comprises a polygonal shape, and the outer surface of the incompressible sleeve comprises a polygonal shape complementary to that of the center hole.

16. The wheel assembly of claim 11 wherein each opening in the plurality of openings is circular.

17. An article of luggage comprising:
a bottom wall, a top wall, opposed first and second side walls, and opposed front and back walls that define a cavity for storage space;
a plurality of wheel assemblies connected to the bottom wall, at least one wheel assembly comprising:
a stem member mounted to a respective wheel housing,
a first wheel and a second wheel each rotatably attached to opposing sides of the stem member;
a first shock absorber component interposed between the first wheel and the stem member, and a second shock absorber interposed between the second wheel and the stem member, each of the first and second shock absorbers individually comprising:
a resilient circular member comprising:
an outer circumference;
a center hole comprising an incompressible sleeve, and an axle disposed within the incompressible sleeve; and
a plurality of openings radially disposed between the outer circumference and the center hole, the plurality of openings configured to resiliently deform and absorb shock when the circular member is subjected to force along its longitudinal axis, wherein the outer circumference of the circular member comprises a notch or projection portion configured to mate with a complementary projection or notch portion in a stem member for a wheel assembly to secure the circular member to the stem member.

18. The article of luggage of claim 17 wherein each opening in the plurality of openings is circular.

19. The article of luggage of claim 17 wherein the incompressible sleeve comprises a flanged end sized to cover the plurality of openings on the respective side of the circular member.

20. The article of luggage of claim 17 wherein the outer surface of the incompressible sleeve and the center hole are configured complementary to each other for securely fitting the incompressible sleeve within the center hole.

21. The article of luggage of claim 20 wherein the center hole comprises a polygonal shape, and the outer surface of the incompressible sleeve comprises a polygonal shape complementary to that of the center hole.

22. The article of luggage of claim 21 wherein the center hole is octagonal, the outer surface of the incompressible sleeve is octagonal, and the plurality of openings comprises up to twelve circular holes.

23. The article of luggage of claim 17 wherein the force along the longitudinal axis is in the direction from the center hole toward the outer circumference, or in the direction from the outer circumference to the center hole, or both.

24. The article of luggage of claim 17 wherein the circular member is comprised of a thermoplastic elastomer (TPE).

25. The article of luggage of claim 17 wherein the incompressible sleeve is comprised of a reinforced polyamide nylon.

* * * * *